Nov. 4, 1941.    H. W. GREENUP    2,261,832
METHOD OF MAKING RUBBER ARTICLES
Filed April 21, 1938
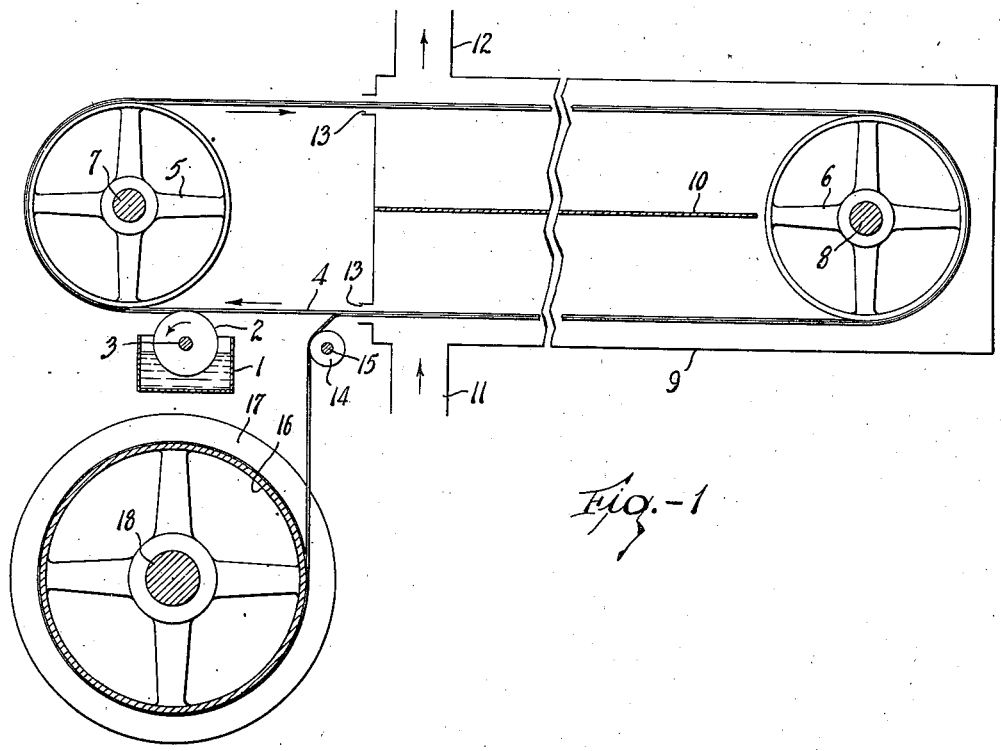
Fig.-1
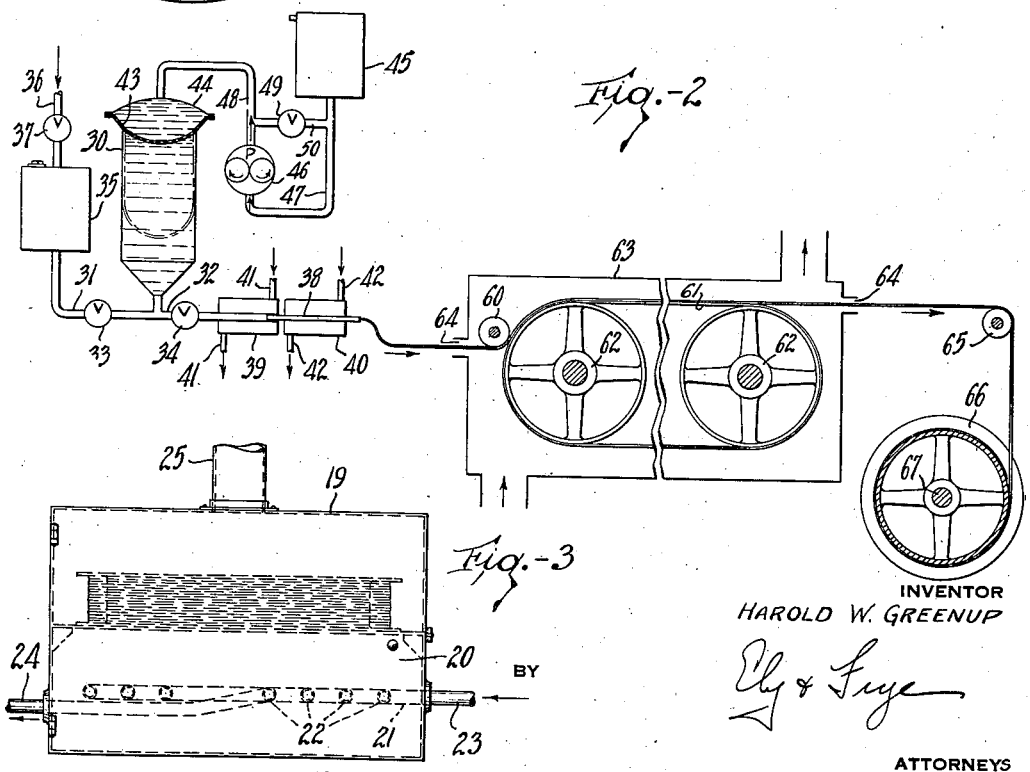
Fig.-2
Fig.-3
INVENTOR
HAROLD W. GREENUP
BY
ATTORNEYS Patented Nov. 4, 1941

2,261,832

UNITED STATES PATENT OFFICE 2,261,832

METHOD OF MAKING RUBBER ARTICLES

Harold W. Greenup, Akron, Ohio, assignor to The Firestone Tire & Rubber Company, Akron, Ohio, a corporation of Ohio Application April 21, 1938, Serial No. 203,315

10 Claims. (Cl. 18—54)

This invention relates to a novel method of enlarging, or elongating, coagulated latex and also to novel compositions which facilitate the annealing of stretched latex rubber.

It is well known to coagulate latex in strip, or thread, form, draw out the thread, dry and then vulcanize the stretched thread. Partially vulcanized rubber has also been stretched and then been completely vulcanized. The product so obtained is a stiff, "racked" rubber of unusual properties. Rubber also has been compounded with sulfur, stretched and vulcanized to produce a product which is not completely relaxed after vulcanization, especially if the rubber is stretched considerably before vulcanization. In all events, the rubber retracts a variable amount after vulcanization so that it is substantially impossible to obtain a uniform product.

The general object of this invention is to produce a rubber product which may be stretched any desired amount up to 700 or 800% and be completely relaxed and vulcanized, without appreciable retraction after vulcanization, to yield a product of high elongation.

Another object of this invention is to provide latex rubber compositions which, after being stretched, inherently relieve themselves of internal stresses upon the application of heat, prior to the curing thereof.

The foregoing and other objects are achieved, by forming a continuous film of latex and then completely drying the latex to form latex rubber prior to stretching to permit several hundred percent elongation thereof. The stretched latex rubber is retained in such condition and subjected to heat, which treatment completely anneals the stretched latex rubber. Further heating cures, or vulcanizes, the latex rubber to retain it in its elongated form with no retraction resulting upon removal of the distorting force. The latex is compounded with no free sulfur therein to prevent vulcanization from starting immediately upon the application of heat.

In the accompanying drawing:

Figure 1 is an elevation, partly in section, of one form of apparatus for practicing the invention;

Figure 2 is an elevation, partly in section, of a modified form of apparatus for practicing the invention; and Figure 3 is an elevation of an oven used in practicing the invention.

Referring specifically to Figure 1, it includes a tank 1 which is provided to retain latex therein. The composition of the latex will be completely described hereinafter. A disc 2 is mounted upon a suitably journaled shaft 3 so that the disc 2 dips in latex in the tank 1. An endless belt 4 bears upon disc 2 and is carried by two pulleys 5 and 6 which are carried by suitably journaled shafts 7 and 8 respectively. Suitable means (not shown) rotate the pulleys and disc at the same surface speeds. Thus rotation of the pulleys and the disc continually deposits a strip of liquid latex upon the belt 4, this being produced by the disc 2 picking up latex from the tank 1 upon rotation.

In order to dry the latex deposited upon belt 4, a drying oven 9 encloses the pulley 6 and a major portion of the belt, the oven being provided with a baffle plate 10 at one end thereof. A flue 11 is supplied with heated air from any suitable source (not shown) and leads the heated air into the oven 9 through which it circulates prior to exhausting through flue 12. Small openings 13 are formed in the oven 9 to permit ingress and egress of the belt 4. It will be evident that the dimensions of the oven 9 and the temperature of the heated air supplied thereto will vary considerably with the speed of the pulleys 5 and 6, the analysis of the latex mixture, and the size of the latex film on the belt. It also is apparent that any desired width of latex film can be obtained by varying the width of the disc 2.

When the dried strip of latex rubber leaves the drying oven 9, it is led from the belt 4 to a pulley 14 which is carried by a suitably mounted shaft 15. The pulley 14 may or may not be driven, as desired. From the pulley 14 the dried latex rubber strip is led to a drum 16, having radially-directed flanges 17 at each edge thereof, that is mounted on a shaft 18 which is driven by any desired variable speed driving means (not shown). The surface speed of the pulley 16 is in all cases considerably greater than the speed of belt 4. Thus the latex rubber strip pulled from the belt 4 over the pulley 14 is stretched an appreciable amount in passing from the pulley to the drum. This elongation may be as high as 500%, but it may be varied appreciably depending upon the compounding, desired use, etc., of the product.

After the latex rubber strip has been wrapped around the drum 16, the drum is placed in a curing oven similar to that shown in Figure 3. This comprises the chamber 19 having a hinged door 20 to permit ready insertion of the drum 16 into the curing oven. Heat is supplied to the chamber 19 by any suitable means, which may include a heating coil 21 having a plurality of cross pipes 22 to distribute heat throughout the entire chamber. Steam may be supplied to coil 21 through a pipe 23 and exhausted therefrom by an outlet pipe 24. An exhaust flue 25 connects to the chamber 19. When the drum 16 is first placed in the chamber 19, it may be left in about half an hour in order to anneal, or relax, the elongated latex rubber strip, for it has been found that heat relieves the latex rubber from internal stresses set up by the elongation thereof if vulcanization does not commence immediately upon the application of heat. Thus the invention is practiced with a latex composition which provides no vulcanization agent concurrently with the initial heating thereof. After annealing, the latex strip around the drum is cured by further heating thereof, the curing operation being either a continuation of the annealing heat, or an entirely separate application of heat, as desired.

The latex mixture used in the practice of the invention preferably includes the following ingredients in substantially the proportions given:

|  | Grams |
|---|---|
| Concentrated latex | 166 |
| 40% zinc oxide dispersion | 12½ |
| 50% di-pentamethylene thiuram tetra sulfide dispersion | 6 |

This mixture has been used in the practice of the invention and was used to form a latex strip which was dried and then stretched to 500% of its original length. This strip was retained in its stretched condition and heated for two hours at approximately 100° C. Application of heat first effected a complete relaxation of the stresses in the latex rubber and then cured the latex rubber strip in its elongated form. This is shown by the fact that the cured latex rubber did not retract upon removal of the stretching force, indicating complete relaxation thereof prior to curing. The strip had an elongation of 600% with relation to its cured length. The surprising result obtained is believed to be due to a delayed action of the accelerator, di-pentamethylene thiuram tetra sulfide, which is known as Tetrone A. The Tetrone A contains 25% of sulfur that, although initially in combined form, is freed for use as a vulcanizing agent upon continued heating. Thus no free sulfur is present originally in the latex so that no vulcanization occurs until sulfur is freed from the Tetrone A and this doesn't occur until the internal stresses in the latex are relieved. Both the zinc oxide and the Tetrone A were mixed with the concentrated latex as aqueous dispersions. Concentrated latex is preferably used in practicing the invention, and it may be prepared in any suitable manner.

The exact proportions of ingredients given above need not be strictly adhered to and it has been found that the Tetrone A dispersion may vary from about 2 to about 8 grams while the zinc oxide may vary from about 2.5 to about 15 grams. It also has been found that tetramethyl thiuram di or tetra sulfide may be substituted for the Tetrone A.

The invention has also been practiced when the following ingredients, in approximately the proportions indicated, were used:

|  | Grams |
|---|---|
| Concentrated latex | 166 |
| 50% piperdinium pentamethylene dithiocarbamate dispersion | 2 |
| 40% zinc oxide dispersion | 5 |

The zinc oxide and the piperdinium pentamethylene dithiocarbamate, which is commonly referred to as "Pip-Pip," were dispersed in water when mixed with the concentrated latex. This mixture was dried while in sheet form, and the sheet stretched to approximately 500% of its original length, in which condition it was heated thirty minutes at 100° C. While retained in its stretched condition, the sheet was dusted with sulfur and cured one hour at 100° C. After curing, the sheet did not retract and could be elongated to 600% of its cured length.

The foregoing examples indicate that dried latex rubber can be stretched to several times its original length and thereafter be processed to form a final product which has normal elasticity even though it now forms an article several times longer than the original. A particular feature is that the elongated strip is completely relaxed prior to vulcanization, whereby the cured strip does not retract at all when the stretching force is removed therefrom. Thus its final size can be accurately predicted.

A modification of the apparatus for practicing the invention is shown in Figure 2. This apparatus includes a vertically extending latex container 30 which is supplied with latex through a pipe 31 which connects to the outlet pipe 32 of the container. Valves 33 and 34 are included in pipes 31 and 32 respectively, to control the flow of latex. The pipe 31 extends to a tank 35 which stores a volume of latex therein. Pressure is exerted upon the latex in tank 35 by compressed air supplied thereto by pipe 36 that connects to a suitable pressure source. Thus when valve 37, in pipe 36, is opened, valve 33 opened and valve 34 closed, the pressure on latex in tank 35 forces it into the container. In this modification of the invention, a heat-sensitized latex should be used; that is, latex treated so that heat will coagulate it.

The outlet pipe 32 from the container connects to a thread forming tube 38 that has two jackets 39 and 40 therearound. The jacket 39 is adjacent the entrance end of the tube 38 which should be kept at a relatively low temperature to prevent premature coagulation; thus cold water is circulated through the jacket 39 by tubes 41, that connect to a water supply. Since the latex must be heated while in the tube 38 to coagulate it while in the tube, steam is circulated in the jacket 40 by means of tubes 42 which connect to a suitable source of steam. Valve 33 is closed and valve 34 is opened when latex is to be forced from the container 30 to the forming tube 38.

In order to force the latex through the tube 38, means are provided for placing pressure upon the upper surface of the latex in the container 30. These means may comprise a rubber diaphragm 43 which is secured across the top of the container, and to which pressure is applied. A cover 44 is secured across the top of the container. A liquid storage tank 45 is positioned adjacent the container 30 and it connects to a constant feed pump 46 through pipe 47. The outlet of the pump 46 connects to the top of the container 30 through a pipe 48 to force liquid into the container 30. Then by using a suitable, non-compressible liquid, such as glycerine, in the system mainly comprising the upper portion of container 30, the storage tank 45 and the pump 46, it will be seen that glycerine is forced into the container at a constant rate of flow by pump 46. This forces the rubber diaphragm 43 downwardly and thereby expels latex from the container at the same rate as the glycerine is forced therein. Obviously the rate of flow may be varied as desired but it will remain constant at any given value. When the container 30 is substantially emptied of latex, a valve 49 in a by-pass tube 50 around the pump is opened after the pump is stopped. Then the valves 33, 34 and 37 are adjusted so that pressure from pipe 36 can force latex into the container 30. This pushes glycerine from the container through the pipe 50 and into the storage tank 45.

Turning to the latex thread expelled from the tube 38, it is led onto a pulley 60 which aids in depositing it upon a belt 61 that is carried by suitably journaled pullies 62. The latex rubber thread is dried, in accordance with the teaching of the invention, by an oven 63 that is around the pulleys 60 and 62. The oven is provided with suitable means (not shown) for forcing heat therethrough and also with openings 64 for the passage of the latex rubber thread therethrough. After the dried latex rubber thread leaves the pulley 62, it is led from the oven 63 to a pulley 65 and then to a drum 66 which is carried by a shaft 67 that is driven by any desired means. In all events, the drum 65 is driven at a greater surface speed than either of the pulleys 60 or 62. Thus the latex rubber thread is elongated appreciably, as well as being reduced in diameter after being dried. Then the latex rubber thread is annealed and vulcanized in accordance with the invention.

In accordance with the patent statutes, I have illustrated and described the principle and mode of operation of the preferred embodiments of the invention. However, it will be understood that various modifications can be made without departing from the scope of the invention as described in the appended claims.

What is claimed is:

1. That method of producing a rubber article comprising forming a strip of wet latex, drying the latex to form a rubber strip, stretching the dried strip, heating the stretched strip of rubber to relieve the stresses set up by the elongation thereof, the rubber being free from vulcanization agents to avoid vulcanization upon the heating thereof, dusting sulphur upon the rubber and vulcanizing the rubber to retain it in its elongated, relieved form.

2. That method of producing a rubber article comprising forming a strip of wet latex, drying the latex to form a rubber strip, stretching the dried strip, heating the stretched strip of rubber to relieve the stresses set up by the elongation thereof, applying a vulcanization agent to the rubber strip and vulcanizing the rubber to produce a rubber strip which normally is of the size of the stretched rubber strip.

3. That method of producing rubber threads, strips, tubing or sheeting comprising forming a strip of wet latex containing zinc oxide and dipentamethylene thiuram tetrasulfide but no free sulfur, drying the latex to form a rubber strip, stretching the dried rubber strip, and heating the dried strip, the heating first relieving the stresses produced in elongating the rubber and then freeing sulfur from the dipentamethylene thiuram tetrasulfide whereby the rubber strip is vulcanized in its relieved elongated condition.

4. That method of producing rubber threads, strips, tubing or sheeting, comprising the steps of forming a continuous strip of wet latex containing no free sulfur, drying the latex to form a rubber strip, stretching the dried rubber strip, and heating the elongated rubber strip in the presence of a delayed action accelerator which is capable of releasing free sulfur upon prolonged heating whereby the stresses produced in the strip by its elongation are relieved prior to vulcanization.

5. That method of producing rubber threads, strips, tubing or sheeting, comprising the steps of forming a continuous strip of wet latex containing no free sulfur, drying the latex to form a rubber strip, stretching the dried rubber strip and heating the elongated strip in the presence of a member from the group consisting of dipentamethylene thiuram tetrasulfide, tetramethyl thiuram disulfide, and tetramethyl thiuram tetrasulfide.

6. That method of producing a rubber article comprising the steps of coagulating latex in a given form to produce a rubber mass, stretching the rubber, and heating the stretched rubber, the latex being compounded to prevent vulcanization from starting immediately upon heating whereby the stresses produced in the rubber by its distortion are relieved prior to vulcanization.

7. That method of producing a rubber article comprising the steps of coagulating latex containing a delayed action accelerator adapted to release sulfur therefrom upon application of heat thereto, drying the latex to produce a rubber mass, stretching the rubber, heating the distorted rubber, the latex and rubber formed therefrom having no free sulfur therein whereby heating the rubber produces no immediate vulcanization action and continuing the heating of the rubber to free sulfur from the accelerator and to vulcanize the rubber.

8. The process of making an elastic filament comprising the successive steps of forming a filament from a vulcanizable rubber latex containing no free sulfur and a vulcanizing substance or substances which effect appreciable vulcanization of the rubber only after prolonged heating of same, said substance being adapted to release sulfur therefrom upon the application of heat thereto, drying the filament substantially to complete dryness, elongating the filament to reduce its cross section, heating the filament to a temperature sufficient to cause relaxation of the nerve of the rubber, said substance or substances acting to effect no appreciable vulcanization of the rubber until the filament is substantially relaxed, and continuing the application of heat to said filament for a sufficient length of time to free sulfur from said substance or substances and to vulcanize the rubber.

9. The process of making an elastic thread comprising the successive steps of forming a tape from a vulcanizable rubber latex containing a substance which effects appreciable vulcanization of the rubber only after prolonged heating of same, drying the tape substantially to complete dryness, rolling the tape upon itself to form a thread, stretching the thread to reduce its cross section, heating the thread to a temperature and for a period sufficient to cause relaxation of the nerve of the rubber, said substance acting to effect no appreciable vulcanization of the rubber until the thread is substantially relaxed, and continuing the application of heat to said thread for a sufficent length of time to activate said substance and to vulcanize the rubber.

10. The process of making an elastic filament comprising the successive steps of forming a filament from a vulcanizable rubber latex containing a substance which effects appreciable vulcanization of the rubber only after prolonged heating of same, drying the filament substantially to complete dryness, elongating the filament to reduce its cross section, heating the filament to about 100° C. to cause relaxation of the nerve of the rubber, said substance acting to effect no appreciable vulcanization of the rubber until the filament is substantially relaxed, and continuing the application of heat to said filament for a sufficient length of time to activate said substance and to vulcanize the rubber.

HAROLD W. GREENUP.